(12) United States Patent
Takaba et al.

(10) Patent No.: US 6,393,214 B1
(45) Date of Patent: May 21, 2002

(54) LENS-FITTED FILM UNIT, LENS-FITTED FILM UNIT PACKAGE AND METHOD OF MANUFACTURING LENS-FITTED FILM UNIT PACKAGE

(75) Inventors: Tetsufumi Takaba; Katsuyuki Koizumi; Hiromi Nakanishi; Hiroshi Kibayashi, all of Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/577,181

(22) Filed: May 23, 2000

(30) Foreign Application Priority Data

May 27, 1999 (JP) .......................................... 11-148059

(51) Int. Cl.$^7$ .............................................. G03B 17/02
(52) U.S. Cl. ........................... 396/6; 396/176; 396/179
(58) Field of Search ........................... 396/6, 238, 257, 396/26, 449, 451, 246, 452, 176, 179, 205

(56) References Cited

U.S. PATENT DOCUMENTS

| | | | |
|---|---|---|---|
| 4,999,664 A | * 3/1991 | Foust | ........................ 396/26 |
| 5,241,334 A | * 8/1993 | Kobayashi et al. | ........... 396/86 |
| 5,337,099 A | * 8/1994 | Tasaka et al. | .................. 396/6 |
| 5,565,945 A | * 10/1996 | Tobise et al. | ................... 396/6 |
| 5,628,039 A | 5/1997 | Muramatsu et al. | |
| 5,721,995 A | 2/1998 | Katsura et al. | |
| 5,815,757 A | 9/1998 | Katsura et al. | |

* cited by examiner

*Primary Examiner*—David M. Gray
(74) *Attorney, Agent, or Firm*—Bierman, Muserlian and Lucas

(57) ABSTRACT

A lens-fitted film unit package, including: a lens-fitted film unit further including: (a) a preloaded photographic film; (b) a camera lens; (c) a shutter; (d) a diaphragm; and (e) an EV value switcher for switching the EV value of the lens-fitted film unit between the first EV value and the second EV value, which is greater than the first EV value; and a packing material; in which the lens-fitted film unit is packaged in the packing material under the condition that the EV value of the lens-fitted unit is switched to the second EV value.

13 Claims, 4 Drawing Sheets

70

LENS-FITTED FILM UNIT, LENS-FITTED FILM UNIT PACKAGE AND METHOD OF MANUFACTURING LENS-FITTED FILM UNIT PACKAGE

BACKGROUND OF THE INVENTION

The present invention relates to a lens-fitted film unit package wherein a lens-fitted film unit capable of being switched between a first EV value and a second EV value which is greater than the first EV value is packaged in a packing material, and to a method of manufacturing the lens-fitted film unit package.

The one and only exposure function in a conventional lens-fitted film unit is a combination of a fixed aperture of a camera lens and a single shutter speed, and this exposure condition is used in the daytime for photographing, while in a room or in the nighttime, the same exposure condition is used for photographing under an electronic flash, and overs and shorts of the exposure are covered by film latitude.

Further, there is available on the market a lens-fitted film unit equipped with a barrier which opens and shuts in front of a camera lens to prevent that the camera lens is soiled with dust or is scratched when the lens-fitted film unit is not used.

When photographing an object which is at a short distance such as a figure and a distant object such as a scenery in the daytime under high intensity and photographing, under electronic flash, only an object which is at a short distance such as a figure in a room under low intensity, a possibility of over-exposure or under-exposure is relatively low even when a conventional lens-fitted film unit is used.

However, under-exposure is caused when a lens-fitted film unit of this kind is used for photographing a scenery in the morning and evening where intensity is slightly low. It is therefore considered that a high speed film is loaded, which, however, makes photographing under lower intensity possible, and may cause ever-exposure in the case of high intensity.

To cope with a problem of this kind, there is disclosed in a patent publication a lens-fitted film unit wherein a camera lens having a relatively small f-number is used, and photographing is conducted with an open aperture in the case of low intensity, and a diaphragm having a small aperture is inserted in the case of high intensity, so that a distant object may be photographed with neither over-exposure nor under-exposure for a luminance range from high intensity to low intensity.

Though the aforesaid arrangement makes it possible to photograph an object under high intensity to an object under low intensity, chances of outdoor photographing under high intensity are usually much more than those of evening or indoor photographing under low intensity. Therefore, when it is possible to switch between an open aperture and a diaphragm having a small aperture as stated above, there are caused problems to get over-exposure photographs by photographing with an exposure condition for low intensity despite high intensity for the start of new photographing, and to lose a precious shutter chance by conducting switching operations.

SUMMARY OF THE INVENTION

The present invention has been achieved in view of the problems stated above, and an object of the invention is to propose a lens-fitted film unit wherein an exposure condition is always switched, for the start of new photographing, to that for high intensity which is used frequently, and switching operations for the exposure condition for low intensity are needed only for the occasion of low intensity, a lens-fitted film unit package, and a method of manufacturing the lens-fitted film unit package.

There is further given the following as another problem.

In the course of development of a lens-fitted film unit conducted by the inventors of the invention, they found out that an intended image was not photographed occasionally on the first frame of a film when the lens-fitted film unit has a switching means capable of switching between a first diaphragm and a second diaphragm whose open aperture area is smaller than that of the first diaphragm. As a result of their intensive study, the reason of the problem proved to be the following.

For example, when a lens-fitted film unit package is dropped accidentally, a shutter position is sometimes shifted by shock of the dropping. If the lens-fitted film unit has therein a means for switching diaphragms and is packaged under the condition that the diaphragm is switched to the first diaphragm having a greater aperture area, when a shutter position is shifted, there is a high possibility that the aperture portion of the diaphragm is not covered by a shutter completely. Then, it was found that if packing materials are torn under the aforesaid condition, external light enters the inner part of the lens-fitted film unit to expose a film, which is a problem.

It was also found that, when a packing material has a transparent portion, if the lens-fitted film unit is packaged under the condition that the diaphragm is switched to the first diaphragm having a greater aperture area, the external light tends to enter the inner part of the lens-fitted film unit through a clearance between a shutter and a diaphragm because of a large aperture area of the diaphragm, causing a possibility that a film is exposed, which is a problem. This problem is especially conspicuous in the mode to provide a diaphragm between a shutter and a camera lens.

The invention has been achieved in view also of this kind of problem. Namely, an object of the invention is to provide, when the lens-fitted film unit has a switching means capable of switching between a first diaphragm and a second diaphragm having an aperture area smaller than that in the first diaphragm, a lens-fitted film unit package having stable functions wherein a film is not exposed when packing materials are torn, even when the lens-fitted film unit package is dropped accidentally.

Further, an object of the invention is to provide a lens-fitted film unit package which can be preserved stably even a packing material has a transparent portion.

The objects mentioned above can be attained by either one of the following.

(1) A lens-fitted film unit package composed of a lens-fitted film unit having therein a photographic film built in beforehand, a camera lens, a shutter, a diaphragm and an EV value switching means capable of switching the EV value of the lens-fitted film unit between the first EV value and the second EV value greater than the first EV value; and a packing material; wherein the lens-fitted film unit is packaged in the packing material under the condition that the EV value of the lens-fitted film unit is switched to the second EV value.

(2) The lens-fitted film unit package according to (1) above, wherein the EV value switching means is a diaphragm switching means capable of switching a diaphragm of the lens-fitted film unit between a first diaphragm and a second diaphragm having an aperture area smaller than that of the first diagram, and the lens-fitted film unit is packaged in the packing material under the condition that the diaphragm is switched to the second diaphragm.

(3) The lens-fitted film unit package according to (1) above, wherein the EV value switching means is a shutter speed switching means capable of switching a shutter speed of the shutter between a first shutter speed and a second shutter speed which is higher than the first shutter speed, and the lens-fitted film unit is packaged in the packing material under the condition that the shutter speed is switched to the second shutter speed.

(4) The lens-fitted film unit package according to (1) above, wherein the lens-fitted film unit has a moving member which moves between a first position which makes photographing possible and a second position which makes photographing impossible, and when the moving member is moved to the second position under the condition that the lens-fitted film unit is set to the first EV value, the EV value switching means is activated to switch to the second EV value.

(5) The lens-fitted film unit package according to (4) above, wherein the moving member has a barrier member which is capable of moving in front of the camera lens, and the first position stated above is a position where the barrier member is retreated from the front part of the camera lens, and the second position stated above is a position where the front part of the camera lens is covered by the barrier member.

(6) The lens-fitted film unit package according to (1) above, wherein the lens-fitted film unit has an electronic flash unit.

(7) The lens-fitted film unit package according to (6) above, wherein charging of the electronic flash unit becomes possible when the EV value of the lens-fitted film unit is switched to the first EV value by the EV value switching means, and charging of the electronic flash unit becomes impossible when the EV value of the lens-fitted film unit is switched to the second EV value by the EV value switching.

(8) The lens-fitted film unit according to (2) above, wherein the diaphragm is provided between the camera lens and the shutter.

(9) The lens-fitted film unit according to (1) above, wherein the packing material has a transparent portion.

(10) The lens-fitted film unit according to (8) above, wherein the packing material has a transparent portion.

(11) A method of producing a lens-fitted film unit package having therein the following steps: a step to assemble a lens-fitted film unit composed of a photographic film built in beforehand, a camera lens, a shutter, a diaphragm, and an EV value switching means capable of switching between a first EV value and a second EV value which is greater than the first EV value; a step to detect the state that the EV value of the lens-fitted film unit is switched to the second EV value by the EV value switching means; and a step to package the lens-fitted film unit with a packing material when the above state is detected by the step to detect.

(12) The method according to (11) above, wherein the EV value switching means is a diaphragm switching means capable of switching the diaphragm between a first diaphragm and a second diaphragm having an aperture area smaller than that of the first diaphragm, and the lens-fitted film unit is packaged in the packing material under the condition that the diaphragm is switched to the second diaphragm.

(13) The method according to (11) above, wherein the EV value switching means is a shutter speed switching means capable of switching a shutter speed of the shutter between a first shutter speed and a second shutter speed which is higher than the first shutter speed, and the lens-fitted film unit is packaged in the packing material under the condition that the shutter speed is switched to the second shutter speed.

(14) A lens-fitted film unit equipped with a moving member which moves between a first position making photographing possible and a second position making photographing impossible, and with a diaphragm switching-means capable of switching properly between a first diaphragm which forms the maximum aperture in the course of photographing and a second diaphragm having an aperture smaller than that of the first diaphragm, and when the moving member is moved to the second position in the case of switching to the first diaphragm, the diaphragm switching means is operated to be switched to the second diaphragm.

(15) A lens-fitted film unit equipped with a moving member which moves between a first position making photographing possible and a second position making photographing impossible, and with a shutter speed switching means capable of switching properly between a first shutter speed and a second shutter speed which is higher than the first shutter speed, and when the moving member is moved to the second position in the case of switching to the first shutter speed, the shutter speed switching means is operated to be switched to the second shutter speed.

(16) A lens-fitted film unit package wherein a lens-fitted film unit equipped with a built-in electronic flash unit and with a diaphragm switching means capable of switching properly between a first diaphragm forming the maximum aperture in the course of photographing and a second diaphragm having an aperture smaller than that of the first diaphragm is packaged under the condition that the diaphragm is switched to the second diaphragm.

(17) A lens-fitted film unit package wherein a lens-fitted film unit equipped with a shutter speed switching means capable of switching properly between a first shutter speed and a second shutter speed which is higher than the first shutter speed is packaged under the condition that the shutter speed switching means is switched to the second shutter speed.

(18) A method of manufacturing a lens-fitted film unit package wherein there are provided a switched diaphragm detecting step which detects that a diaphragm switching means of a lens-fitted film unit which houses a built-in electronic flash unit and is equipped with a diaphragm switching means capable of switching properly between a first diaphragm which forms the maximum aperture in the course of photographing and a second diaphragm having an aperture that is smaller than that of the first diaphragm is switched to the second diaphragm, and a packaging step to package the lens-fitted film unit detected to be switched to the second diaphragm in the switched diaphragm detecting step.

(19) A method of manufacturing a lens-fitted film unit package wherein there are provided a switched shutter speed detecting step which detects that a lens-fitted film unit is packaged in the state that a shutter speed switching means of a lens-fitted film unit equipped with the shutter speed switching means capable of switching freely between a first shutter speed and a second shutter speed that is higher than the first shutter speed is switched to the second shutter speed, and a packaging step to package the lens-fitted film unit detected to be switched to the second shutter speed in the switched shutter speed detecting step.

DETAILED DESCRIPTION OF THE INVENTION

Figure 1:
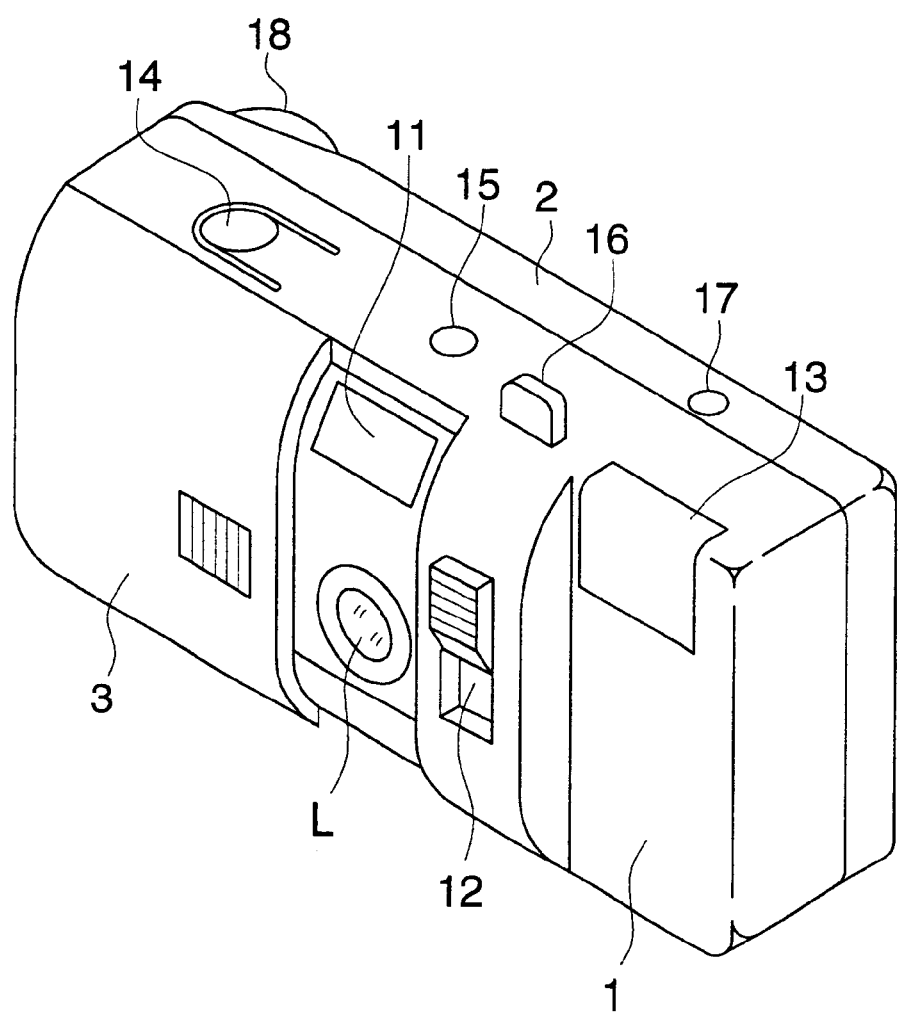
FIG. 1 is a perspective view of an appearance of a lens-fitted film unit.

An embodiment of a lens-fitted film unit of the invention will be explained as follows, referring to FIG. 1–FIG. 4.

A lens-fitted film unit package of the invention has therein a lens-fitted film unit and a packing material. The lens-fitted film unit comprises a photographic film which is housed in advance, a camera lens, a shutter, a diaphragm, and an EV value switching means capable of switching between a first EV value and a second EV value which is larger than the first EV value. The lens-fitted film unit is one packaged by a packing material under the condition that the EV value switching means is switched to the second EV value.

As the EV value switching means, there are given a diaphragm switching means capable of switching between a first diaphragm and a second diaphragm having an aperture area smaller than that of the first diaphragm, and a shutter speed switching means capable of switching a first shutter speed and a second shutter speed which is higher than the first shutter speed. Incidentally, the shutter speed switching means may be one which changes a substantial shutter speed or may also be one which changes exposure time without changing a substantial shutter speed.

First, external parts will be explained as follows, referring to a perspective view of an appearance of a lens-fitted film unit in FIG. 1.

The front side of an inner mechanism of the lens-fitted film unit is covered by front cover 1 and the rear side thereof is covered by rear cover 2.

Camera lens L is provided at the center on the front surface of the front cover 1, and view-finder window 11 is provided on the upper portion of the camera lens L. On the right side of them, there is provided diaphragm switching operation section 12 which is moved up and down manually so that a diaphragm may be switched to a larger one or a smaller one as will be stated later. FIG. 1 is a diagram showing that a diaphragm is switched to the larger diaphragm. Further, on the right side of the diaphragm switching operation section 12, there is provided electronic flash window 13 through which an electronic flash is emitted.

On the top face of the front cover 1, there are provided, from the left side, shutter-release button 14 with which a shutter release operation is conducted, frame-counter window 15 which shows a frame number concerning photographing, and recognition section 16 which protrudes when the diaphragm switching operation section 12 is switched to the larger diaphragm and makes it possible to recognize from the rear side that the diaphragm switching operation section 12 is switched to the larger diaphragm.

On the top face of the rear cover 2, there is provided charging display lamp window 17 which is lit when an electronic flash unit is charged, and on the rear side of the rear cover 2, there is provided film-take-up knob 18 with which an exposed film is taken up into a cartridge.

On the front cover 1 of the present lens-fitted film unit, there is mounted barrier 3 which can be slid manually in the horizontal direction. FIG. 1 is a diagram wherein the barrier 3 is slid to the left side to expose camera lens L and view-finder window 11. When the barrier 3 is slid to the right side, the camera lens L and view-finder window 11 are covered to be prevented from sticking of dust.

Next, constitution for diaphragm switching will be explained as follows, referring to a front view of a diaphragm switching means shown in FIG. 2.

Figure 2:
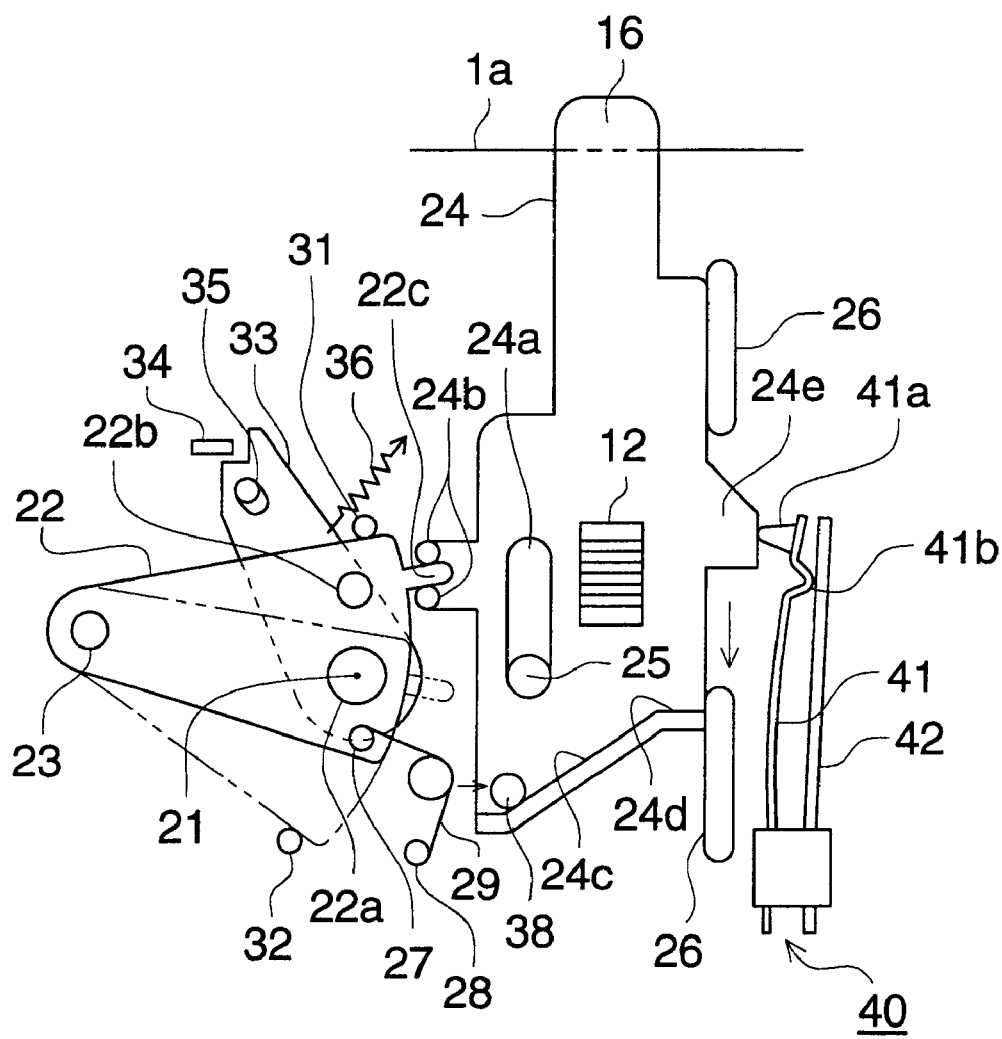
FIG. 2 is a front view of a diaphragm switching means.

In FIG. 2, the numeral 21 represents an optical axis of camera lens L, and behind the camera lens L which is not shown in FIG. 2, there is provided diaphragm switching member 22. The diaphragm switching member 22 has therein large diaphragm 22a which forms the greatest aperture in the course of photographing and small diaphragm 22b whose aperture is smaller than that of the large diaphragm 22a, and the diaphragm switching member 22 is supported to be rotatably around supporting shaft 23. FIG. 2 is a diagram in which the diaphragm switching member 22 is switched to the large diaphragm 22a, and when the diaphragm switching member 22 is swung to the position shown with two-dot chain lines, the diaphragm is switched to small diaphragm 22b.

Incidentally, an aperture of large diaphragm 22a may either be one equivalent to an open aperture of camera lens L or be one smaller than the open aperture of the camera lens L. As an example of the latter case, there are occasions to use under the state of higher optical performance, by making the aperture of the large diaphragm to be slightly smaller than an open aperture of the camera lens, and an occasion wherein a camera lens is used in common in plural model types and the aperture does not need to be large, because a high speed film is loaded.

The numeral 24 is a diaphragm switching operation member which conducts operations to switch a diaphragm, and it has, on its center, the diaphragm switching operation section 12 stated above. Due to operations of the diaphragm switching operation section 12, the diaphragm switching operation member 24 slides vertically with its right end touching guide section 26 and with its elongated hole for guide 24a being engaged with guide pin 25. On the left end of the diaphragm switching operation member 24, there are provided two engagement pins 24b which engage with engagement section 22c provided on the right end of the diaphragm switching member 22.

Therefore, when the diaphragm switching operation section 12 is operated to make the diaphragm switching operation member 24 to slide vertically, the diaphragm switching member 22 is swung, thus, when the diaphragm switching operation member 24 is slid upward, large diaphragm 22a moves to the position of optical axis 21, while when the diaphragm switching operation member 24 is slid downward, small diaphragm 22b moves to the position of optical axis 21.

Further, tumbler spring 29 is hooked on both pin 27 provided on the lower portion on the right end of the diaphragm switching member 22 and pin 28 provided on an unillustrated shutter base plate. The tumbler spring 29 is one to urge in both directions from a dead point which is almost at the center of the tumbler spring.

Therefore, when switching from the state of the small diaphragm 22b to the state of the large diaphragm 22a, for example, the diaphragm switching operation section 12 is operated to cause the diaphragm switching operation member 24 to slide upward part way against urging force of the tumbler spring 29, and the diaphragm switching member 22 is swung counterclockwise, but when passing through the dead point, the urging force of the tumbler spring 29 makes the diaphragm switching member 22 to continue swinging, even when a hand is taken off, and the diaphragm switching member stops when it hits stopper 31.

Further, when switching from the state of the large diaphragm 22a to the state of the small diaphragm 22b, the diaphragm switching operation section 12 is operated to cause the diaphragm switching operation member 24 to slide downward part way against urging force of the tumbler spring 29, and the diaphragm switching member 22 is swung clockwise, but when passing through the dead point, the urging force of the tumbler spring 29 makes the diaphragm switching member 22 to continue swinging, even when a hand is taken off, and the diaphragm switching member stops when it hits stopper 32.

Incidentally, the diaphragm is positioned to its large diaphragm 22a and small diaphragm 22b, respectively when the the diaphragm switching member 22 hits the stoppers 31 and 32, thereby, highly accurate diaphragm positions for optical axis 21 can be obtained.

Further, on the lower portion of the diaphragm switching operation member 24, there is provided cam 24c, and operation pin 38 is protruded from an unillustrated member which moves from side to side interlocking with barrier 3 shown in FIG. 1. If the barrier 3 is closed when the diaphragm switching member 22 is at the large diaphragm 22a and the diaphragm switching operation member 24 is positioned at the upper portion as shown in FIG. 2, the operation pin 38 moves toward the right side to press the cam 24c so that the diaphragm switching operation member 24 is made to slide downward. Therefore, the diaphragm switching member 22 is switched to the small diaphragm 22b as stated above.

Even when the barrier 3 is closed when the diaphragm switching member 22 is at the small diaphragm 22b and the diaphragm switching operation member 24 is positioned at the lower portion, the operation pin 38 passes through the upper portion 24d of the cam 24c so that it does not interfere.

Accordingly, when barrier 3 is closed, a diaphragm is always small diaphragm 22b. For the following photographing, therefore, the diaphragm is switched to small diaphragm 22b which is frequently used, which makes it possible to photograph immediately in the open air.

The numeral 33 represents a shutter blade which is positioned behind the diaphragm switching member 22. When charge lever 34 hits the shutter blade quickly from the left side in a well-known way, the shutter blade swivels clockwise around supporting shaft 35, and then, it is swung counterclockwise by urging force of shutter spring 36, thus, the shutter blade conducts opening and shutting operations.

The numeral 40 represents a main switch of an electronic flash, and when the diaphragm switching operation member 24 is located to be at its upper position, cam 24e located at the right side of the diaphragm switching operation member presses insulation section 41a provided on the tip of movable contact blade 41, and thereby, curved portion 41b comes in contact with fixed contact blade 42. Accordingly, the main switch 40 is turned on, and charging of the electronic flash is started. Incidentally, when the diaphragm switching operation member 24 is located to be at its lower position, cam 24e does not press insulation section 41a, and the main switch 40 is turned off. Incidentally, it is also possible to make a charge-starting switch for starting the charging of an electronic flash unit to serve concurrently as the diaphragm switching operation member.

Further, when the diaphragm switching operation member 24 is located to be at its upper position, an upper end of the diaphragm switching operation member 24 protrudes from upper surface 1a of the front cover 1. This corresponds to the recognition section 16 shown in FIG. 1 which makes it possible to recognize from the rear side that the diaphragm is a larger diaphragm.

Though the embodiment explained above has mechanism wherein a diaphragm is switched between a large diaphragm and a small diaphragm, it is also possible to employ mechanism wherein a shutter speed is switched between a high speed and a low speed. A switching mechanism for shutter speeds of this kind is shown in a front view in FIG. 3, and is explained below.

Figure 3:
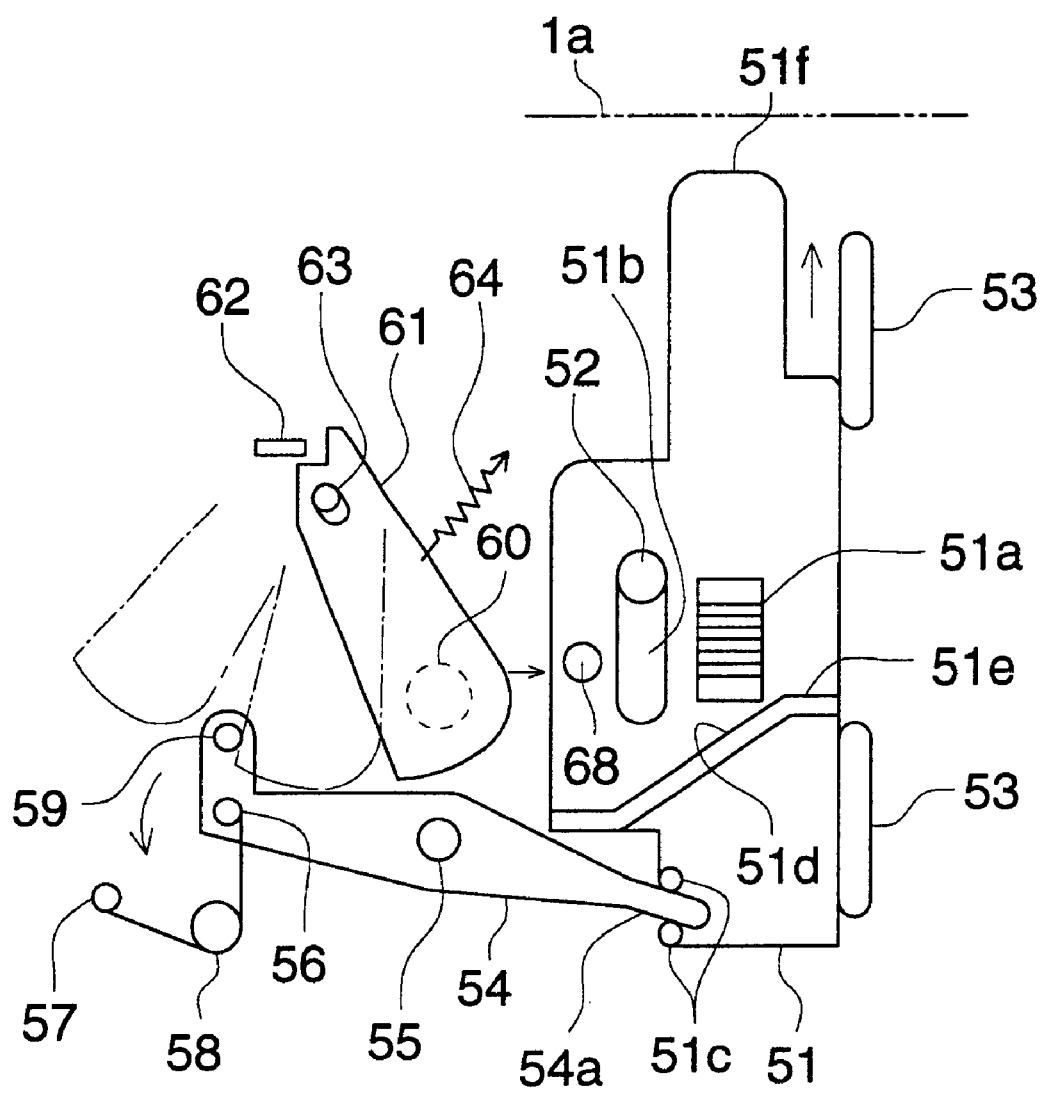
FIG. 3 is a front view of a shutter speed switching mechanism.

In FIG. 3, the numeral 51 represents a shutter speed switching operation member, and it has, on its center, shutter speed switching operation section 51a which is operated manually. When the shutter speed switching operation section 51a is operated, the shutter speed switching operation member 51 slides vertically, with its elongated hole 51b engaging with guide pin 52 and with its right end portion touching guide section 53.

On the lower portion of the shutter speed switching operation member 51, there are provided two engagement pins 51c which engage with right end 54a of shutter speed adjustment member 54. The shutter speed adjustment member 54.is supported by supporting shaft 55 to be rotatable around it, and tumbler spring 58 is hooked on pin 56 provided on the left end of the shutter speed adjustment and on pin 57 provided on an unillustrated shutter base plate. Therefore, both the shutter speed switching operation member 51 and the shutter speed adjustment member 54 are urged respectively in both direction by the tumbler spring 58, in the same way as in FIG. 2.

The numeral 61 represents a shutter blade. When charge lever 62 hits the shutter blade quickly from the left side in a well-known way, the shutter blade swivels clockwise around supporting shaft 63 to expose opening section 60 of the shutter base plate, and then, the shutter blade is swung counterclockwise by urging force of shutter spring 64 to close the opening section 60.

When the shutter speed switching operation section 51a is operated to make the shutter speed switching operation member 51 to be located at its lower position as shown in FIG. 3 in this case, shutter speed adjustment member 54 rotates clockwise. In this case, when the shutter blade 61 rotates clockwise to conduct opening operation, its left end portion comes in contact with stopper pin 59 provided on the upper part on the left end of the shutter speed adjustment member 54 to make the opening time of the opening section 60 to be short, and then, the urging force of the shutter spring 64 causes the shutter blade to close the opening section 60. Accordingly, the high shutter speed is obtained.

On the other hand, when the shutter speed switching operation section 51a is operated to make the shutter speed switching operation member 51 to be located at its upper position, the shutter speed adjustment member 54 rotates counterclockwise. In this case, when the shutter blade 61 rotates clockwise to conduct opening operation, the stopper pin 59 retracts from the left tip portion of the shutter blade 61. Therefore; the shutter blade 61 rotates sufficiently to make the opening time of the opening section 60 to be long. Accordingly, the low shutter speed is obtained.

Further, in the same way as in the foregoing, cam 51d is provided on the lower portion of the shutter speed switching operation member 51, and operation pin 68 is protruded from an unillustrated member which moves from side to side, interlocking with barrier 3 shown in FIG. 1. When the barrier 3 is closed while the shutter speed switching operation member 51 is located at its lower position as shown in FIG. 3, the operation pin 68 passes through upper portion 51e of the cam 51d, causing no interference. However, if the barrier 3 is closed while the shutter speed switching operation member 51 is located at its upper position, the operation pin 68 moves toward the right side and presses cam 51d to make the shutter speed switching operation member 51 to slide downward. Therefore, the shutter speed adjustment member 54 is switched to the high speed state as stated above.

Accordingly, when the barrier 3 is in its closed state, the shutter speed is always high, and the high shutter speed for which the photographing frequency is high is ready for the following photographing, making the immediate outdoor photographing to be possible.

When the shutter speed switching operation member 51 is located at its upper position, it means that the shutter speed is switched to the low speed. Therefore, upper end 51f of the shutter speed switching operation member 51 is protruded from upper surface 1a of the front cover 1 as in the foregoing so that the shutter speed may be judged even from the rear side. Incidentally, even in this embodiment, it is also possible to make a charge-starting switch for starting charging of an electronic flash unit to serve concurrently as the shutter speed switching operation member.

In the aforesaid structure shown in FIGS. 2 and 3, both the diaphragm switching operation member 24 and the shutter speed switching operation member 51 slide vertically. However, the structure is not limited to one for sliding in the vertical direction, but it may be one for sliding in the horizontal direction, or one for rotating. In short, the scope of the invention include the structure wherein a diaphragm can be switched or a shutter speed can be switched, and switching can be done from a large diaphragm to a small diaphragm in the case of a diaphragm, and from the low speed to the high speed in the case of a shutter speed, both interlocking with a closing operation of a barrier.

Further, it is not always necessary to use tumbler springs 29 and 58, and for example, the diaphragm switching operation member 24 or the shutter speed switching operation member 51 may be provided with a click-stop device which stops at two positions.

It is further possible to employ the structure wherein the structure for switching a shutter speed shown in FIG. 3 is added to the structure for switching a diaphragm shown in FIG. 2. When a lens-fitted film unit has therein an electronic flash unit, it is possible to use a mode wherein charging of the electronic flash unit is started, in the case of photographing under an electronic flash, if an electronic flash switching lever representing a switching operation means which switches between use and non-use of an electronic flash unit is slid. It is also possible to make the electronic flash switching lever to serve concurrently as an EV value switching operation member such as a diaphragm switching operation member and a shutter speed switching operation member.

Further, when a photographic film built in a main body beforehand is a 135 film, ISO speed which is 400 or more is preferable, and the more preferable is 640 or more. When a photographic film is an APS film, the ISO speed of the film which is within a range of 400–800 is preferable, and the more preferable is a range of 400–640.

When assuming that A represents EV value of standard exposure amount under the state of electronic flash photographing −1, it is preferable that a T number determined by a guide number of an electronic flash unit, a camera lens and by a diaphragm is determined and a shutter speed of a shutter device is determined so that A is not more than 8.5 and a latent image formed on a photographic film when a standard reflection plate positioned at a prescribed distance of 2 m–3 m from a lens-fitted film unit is irradiated and photographed by an electronic flash unit under the state of no external light and of photographing under an electronic flash may correspond to a latent image obtained by photographing intensity of not more than A+5.0 in terms of EV value. Incidentally, it is more preferable that A is not more than 7.5.

Incidentally, "standard exposure amount A' under the state of photographing under an electronic flash" is a value determined by T number which is determined from a shutter speed of a shutter device, a camera lens and a diaphragm, and from a speed of a photographic film. The standard exposure amount in this specification is a value converted into EV value when ISO 100 film is used, and it is expressed by the following expression (1):

$$A'=[log_{10}F^2+log_{10}(1/T)-log_{10}(S/100)]/log_{10}2 \qquad (1)$$

wherein symbols are as follows.
 F: T number determined by a camera lens and a diaphragm under electronic flash photographing
 T: Shutter speed of a shutter device in the state of electronic flash photographing
 S: ISO speed of a photographic film On the other hand, standard exposure amount B under the state of ordinary photographing (state of non-electronic-flash photographing) is also determined by the same expression. It is a value determined by T number which is determined from a shutter speed of a shutter device, a camera lens and a diaphragm, and from a speed of a photographic film under the state of ordinary photographing. The standard exposure amount in this specification is a value converted into EV value when ISO 100 film is used, and it is expressed by the following expression (2):

$$B=[log_{10}F'^2+log_{10}(1/T')-log_{10}(S/100)]/log_{10}2 \qquad (2)$$

wherein symbols are as follows.
 F': T number determined by a camera lens and a diaphragm under the state of ordinary photographing
 T': Shutter speed of a shutter device in the state of ordinary photographing
 S: ISO speed of a photographic film Incidentally, "standard reflection plate" in the present specification is an 18% reflection plate having a reflectance of 18% established based on reflectance of a skin of an average person. Further, "T number determined by a guide number of an electronic flash unit, a camera lens and by a diaphragm is determined and a shutter speed of a shutter device is determined so that a latent image formed on a photographic film when a standard reflection plate positioned at a prescribed distance of 2 m–3 m from a lens-fitted film unit is irradiated and photographed by an electronic flash unit under the state of no external light and of photographing under an electronic flash may correspond to a latent image obtained by photographing intensity of not more than A+5.0 in terms of EV value" in the present specification means that a position of the standard reflection plate which makes a latent image formed on a photographic film when a standard reflection plate is subjected to photographing under an electronic flash to correspond to a latent image obtained by photographing intensity of not more than A+5.0 in terms of EV value "has only to be at least anywhere in a range of 2 m–3 m from a lens-fitted film unit", and it does not mean that all conditions need to be satisfied when the standard reflection plate is subjected to photographing under an electronic flash in the total range of 2 m–3 m from a lens-fitted film unit.

Further, "intensity of a latent image formed on a photographic film when a standard reflection plate is irradiated and photographed by an electronic flash unit under the state of no external light and of photographing under an electronic flash corresponds to intensity of a latent image obtained by photographing intensity of not more than A+5.0 in terms of EV value" in the present specification means that intensity of a latent image formed on a photographic film when an object having photographing intensity of not more than A+5.0 in terms of EV value is photographed is the same as that of a latent image of a standard reflection plate formed on a photographic film when the standard reflection plate is irradiated and photographed by an electronic flash unit under the state of no external light and of photographing under an electronic flash. Or, the foregoing can also be construed that, when photographic films of the same type each having the intensity same as that in each of the latent images stated above are developed under the same condition, the image density after development on each film is mostly the same as the other.

Further, it is preferable that the guide number of an electronic flash unit in the case of ISO 100 is made to be 2–9. The more preferable is 5–8. When the guide number satisfies the conditions stated above, a main capacitor having a small capacity can be used, which is preferable. To be concrete, in the electronic flash unit in the present embodiment, it is preferable that the capacity of the main capacitor in the electronic flash unit is 15 $\mu$F–80 $\mu$F. The more preferable is 50 $\mu$F–80 $\mu$F. When a main capacitor with a small capacity is used, it is preferable to use a "AAA" battery or an "N" battery, as a battery for an electronic flash unit.

Further, it is preferable that a T number determined from a camera lens and a diaphragm in the state of electronic flash photographing is not more than 11. In other words, when EV value of the lens-fitted film unit is the 2nd EV value, it is preferable that the T number is not more than 11. The more preferable is 5.6–8.6, and still more preferable is 6–8.

Incidentally, the T number is a value obtained by giving consideration of the number of lenses and their materials to an F number, and it is a value determined univocally by the following Expression (3) in the system of a camera lens and a diaphragm:

$$T \text{ number} = F \text{ number}/\sqrt{t} \tag{3}$$

Wherein, t: Transmission factor of a camera lens

Further, it is preferable that a focal length of a camera lens is 28 mm–35 mm. The more preferable is 28 mm–33 mm. It is further preferable that an angle of view is one which is suitable for a focal length of 28 mm–35 mm in a 135 film. The more preferable is one suitable for a focal length of 28 mm–33 mm.

Further, it is preferable that the shutter speed of a shutter device under the state of photographing under an electronic flash is 1/130–1/30, and the more preferable is 1/100–1/30.

Further, it is preferable that shutter speed T of a shutter device under the state of photographing under an electronic flash and guide number G of an electronic flash unit for ISO 100 satisfy the following expression (4).

$$G^2/T < 8000 \tag{4}$$

More preferable value of $G^2/T$ is less than 6500, and still more preferable is less than 5000.

Incidentally, when a diaphragm is changed between the state of ordinary photographing and the state of photographing under an electronic flash, namely, when T number determined by a camera lens and a diaphragm is changed, it is preferable that EV value B of standard exposure amount in the ordinary photographing satisfies the following expression (5).

$$A'+1=B \tag{5}$$

It is more preferable that the following expression (6) is satisfied.

$$A'+1=B=A'+4 \tag{6}$$

It is preferable that standard exposure amount B under the state of ordinary photographing satisfies the condition of not less than 9 and not more than 13, while satisfying the aforesaid expression. The more preferable is not less than 10 and not more than 13.

It is preferable that T number under the state of the ordinary photographing is not less than 9 and not more than 14. In other words, when the EV value of the lens fitted film unit is the 1st EV value, it is preferable that the T number is not less than 9 and not more than 14. The more preferable is not less than 10 and not more than 14.

When a shutter speed of a shutter device is changed between the state of ordinary photographing and the state of photographing under an electronic flash, it is preferable that a shutter speed under the state of the ordinary photographing is not slower than 1/60, and the more preferable is that the shutter speed is within a range from 1/130 to 1/60.

Figure 4:
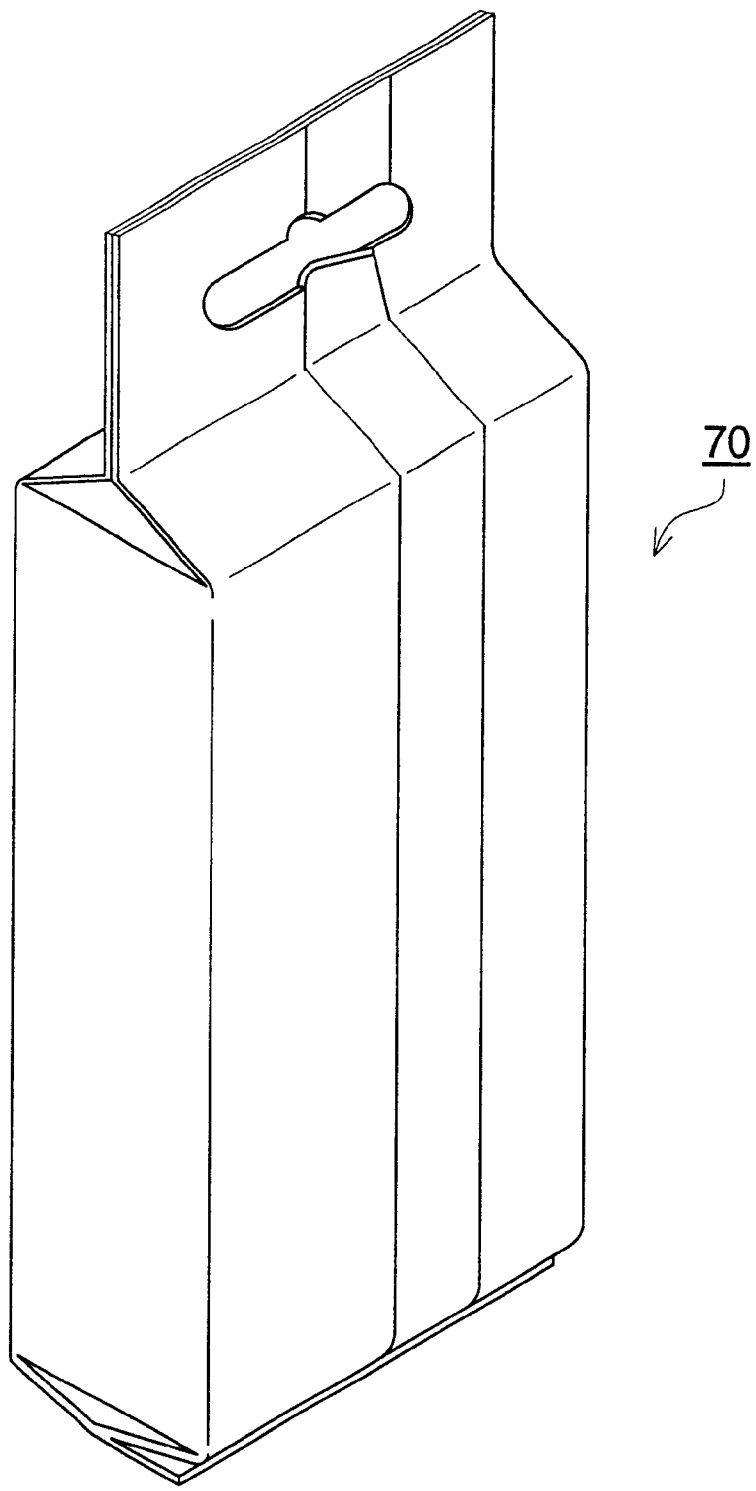
FIG. 4 is a perspective view of a lens-fitted film unit package wherein a lens-fitted film unit is packaged.

In the case of the diaphragm switching structure as in FIG. 2 when the aforesaid structure is used, it is preferable to package under the state of switching to small diaphragm 22b, even when barrier 3 is not provided. Therefore, it is detected, in the diaphragm switching state detection step, that the diaphragm is switched to small diaphragm 22b, and a lens-fitted film unit wherein the state to be switched to small diaphragm 22b is packaged for shipment in packaging container 70 which has a moisture proofing property and is formed to be bag-shaped as shown in FIG. 4 in the packing step.

Even in the case of the shutter speed switching structure as in FIG. 3, it is preferable to package under the state of switching to the high shutter speed even when barrier 3 is not provided. Therefore, it is detected, in the shutter speed switching state detection step, that the shutter speed is switched to the high shutter speed, and a lens-fitted film unit wherein the state to be switched to the high shutter speed has been detected is packaged in packaging container 70 in the packing step in the same way.

As a step to detect that an EV value switching means has been switched to the aforesaid second EV value, there are given the following steps in a concrete way.

For example, there is given a method to detect a position of an EV value switching operation member such as a diaphragm switching operation member and a shutter speed switching operation member. For example, there are given a method to detect the position of an EV value switching operation member through reflection of infrared rays, a method to detect by photographing with a video camera and by processing the photographed images with a computer, and a method to detect protrusion of a diaphragm switching operation member with a device to detect pressure. As another method, there is given a method wherein photographing is conducted automatically by a lens-fitted film unit actually and an instantaneous size of the diaphragm and a shutter speed in the photographing are inspected by an inspection instrument, to detect that the EV value switching means has been switched to the second EV value.

In either case among the foregoing, a lens-fitted film unit packaged and shipped in the aforesaid manner can be used immediately for outdoor photographing when a user unseal the unit for photographing, because a small diaphragm and a high shutter speed which are used frequently are set in advance. Incidentally, a lens-fitted film unit package-is one wherein a lens-fitted film unit is packaged by packing materials. Packing materials are not limited in particular provided that they can pack a lens-fitted film unit, and it is possible to use various ones. As a material of the packing material, for example, paper, resin film, resin film coated with metal, and combination thereof are used. With regard to the shape, it is possible to use properly various ones including those of a bag type and a box type. Packing material which is totally opaque, packing material having a transparent portion, and packing material which is totally transparent are all acceptable.

Lastly, relationship between terminology used in the claim and terminology used in the embodiment will be explained as follows.

The moving member corresponds to barrier 3, the first position corresponds to the position where the barrier 3 is opened, and the second position corresponds to the position where the barrier 3 is closed. However, the moving means is not limited to the barrier, and it may be a moving member which moves between the position where release operation is not interfered and the position where the release operation is interfered.

The diaphragm switching means corresponds to diaphragm switching member 22, diaphragm switching operation member 24 and a member which operates the diaphragm switching member and diaphragm switching operation member, while, the first diaphragm corresponds to large diaphragm 22a and the second diaphragm corresponds to small diaphragm 22b.

The shutter speed switching means corresponds to shutter speed switching operation member 51, shutter speed adjustment member 54 and a member which operates the shutter speed switching operation member and shutter speed adjustment member.

In the lens-fitted film unit of the invention, there are caused no problems to make over-exposure photographs by photographing on the exposure condition for low intensity despite high intensity, and to lose precious shutter chance by conducting switching operations, because an exposure condition is always switched to that for high intensity which is frequently used, when photographing is started newly.

In the lens-fitted film unit of the invention, a user's operation is of a single-touch type, because charging of an electronic flash unit is started simultaneously with switching to the first diaphragm.

In the lens-fitted film unit package and the method of manufacturing the lens-fitted film unit package of the invention, there are caused no problems to make over-exposure photographs by photographing on the exposure condition for low intensity despite high intensity, and to lose precious shutter chance by conducting switching operations, because an exposure condition is always switched to that for high intensity which is frequently used, when unsealing and starting a shot.

When a lens-fitted film unit has therein a diaphragm switching means capable of switching between a first diaphragm and a second diaphragm which has an aperture smaller than that of the first diaphragm, the invention makes it possible to obtain a lens-fitted film unit package having a stable property wherein a film is not exposed in the case of tearing a packing material even when the lens-fitted film unit package is dropped accidentally.

Further, the invention makes it possible to obtain a lens-fitted film unit package which can be preserved stably, even when a packing material has thereon a transparent portion.

Disclosed embodiment can be varied by a skilled person without departing from the spirit and scope of the invention.

What is claimed is:

1. A lens-fitted film unit package, comprising:
   a lens-fitted film unit further comprising:
   (a) a preloaded photographic film;
   (b) a camera lens;
   (c) a shutter;
   (d) a diaphragm;
   (e) an EV value switching means for switching an EV value of said lens-fitted film unit between a first EV value and a second EV value, which is greater than said first EV value;
   (f) a packing material;
   (g) an electronic flash unit;
   wherein said lens-fitted film unit is packaged in said packing material under a condition that said EV value of said lens-fitted film unit is switched to said second EV value,
   charging of said electronic flash unit becomes possible when said EV value of said lens-fitted film unit is switched to said first EV value by said EV value switching means, and charging of said electronic flash unit becomes impossible when said EV value of said lens-fitted film unit is switched to said second EV value by said EV value switching.

2. The lens-fitted film unit package of claim 1, wherein said EV value switching means is a diaphragm switching means for switching said diaphragm between a first diaphragm and a second diaphragm having an aperture area smaller than that of said first diagram, and said lens-fitted film unit is packaged in said packing material under a condition that said diaphragm is switched to said second diaphragm.

3. The lens-fitted film unit package of claim 1, wherein said EV value switching means is a shutter speed switching means for switching a shutter speed of said shutter between a first shutter speed and a second shutter speed which is higher than said first shutter speed, and said lens-fitted film unit is packaged in said packing material under a condition that said shutter speed is switched to said second shutter speed.

4. The lens-fitted film unit of claim 2, wherein said diaphragm is provided between said camera lens and said shutter.

5. The lens-fitted film unit of claim 1, wherein said packing material has a transparent portion.

6. The lens-fitted film unit of claim 4, wherein said packing material has a transparent portion.

7. A method of producing a lens-fitted film unit package, comprising the steps of:
   assembling a lens-fitted film unit comprising:
   (a) a preloaded photographic film built;
   (b) a camera lens;
   (c) a shutter;
   (d) a diaphragm; and
   (e) an EV value switching means for switching an EV value of said lens-fitted film unit between a first EV value and a second EV value which is greater than said first EV value;

(f) an electronic flash unit;

detecting the state that said EV value of said lens-fitted film unit is switched to said second EV value by said EV value switching means, packinging said lens-fitted film unit with a packing material when said state, that said EV value of said lens-fitted film unit is switched to said second EV value by said EV value switching means, is detected in said detecting step;

charging of said electronic flash unit becomes possible when said EV value of said lens-fitted film unit is switched to said first EV value by said EV value switching means, and charging of said electronic flash unit becomes impossible when said EV value of said lens-fitted film unit is switched to said second EV value by said EV value switching.

8. The method of claim 7, wherein said EV value switching means is a diaphragm switching means for switching said diaphragm between a first diaphragm and a second diaphragm having an aperture area smaller than that of said first diaphragm, and said lens-fitted film unit is packaged in said packing material under a condition that said diaphragm is switched to said second diaphragm.

9. The method of claim 7, wherein said EV value switching means is a shutter speed switching means for switching a shutter speed of said shutter between a first shutter speed and a second shutter speed which is higher than said first shutter speed, and said lens-fitted film unit is packaged in said packing material under a condition that said shutter speed is switched to said second shutter speed.

10. A lens-fitted film unit package, comprising:

a lens-fitted film unit further comprising:
(a) a preloaded photographic film;
(b) a camera lens;
(c) a shutter;
(d) a diaphragm;
(e) an EV value switching means for switching an EV value of said lens-fitted film unit between a first EV value and a second EV value, which is greater than said first EV value;
(f) a packing material;

said lens-fitted film unit includes a moving member which moves between a first position which makes photographing possible and a second position which makes photographing impossible, and when said moving member is moved to said second position under the condition that said lens-fitted film unit is set to said first EV value, said EV value switching means is activated to switch said EV value of said lens-fitted film unit to said second EV value.

11. The lens-fitted film unit package of claim 10, wherein said moving member includes a barrier member which is capable of moving in front of said camera lens, and said first position is a position where said barrier member is retreated from a front part of said camera lens, and said second position is a position where said front part of said camera lens is covered by said barrier member.

12. A lens-fitted film unit further comprising:

(a) a preloaded photographic film;
(b) a camera lens;
(c) a shutter;
(d) a diaphragm, having a plurality of apertures; and
(e) a diaphragm switching means for switching said diaphragm between a first aperture, corresponding to a first EV value, of said plurality of apertures and a second aperture, corresponding to a second EV value, of said plurality of apertures;

wherein said second EV value of said second aperture is greater than said first EV value of said first aperture, and said lens-fitted film unit is packaged in said packing material under a condition that said diaphragm is switched to said second aperture so that a EV value of said lens-fitted film unit is set to said second EV value.

13. A lens-fitted film unit comprising:

(a) a preloaded photographic film;
(b) a camera lens;
(c) a shutter;
(d) a mechanism for mechanically switching a shutter speed of said shutter between a first shutter speed, corresponding to a first EV value, and a second shutter speed, corresponding to a second shutter speed;
(e) a diaphragm; and wherein said second EV value of said second shutter speed is greater than said first EV value of said first shutter speed, and said lens-fitted film unit is packaged in said packing material under a condition that said shutter is set to said second shutter speed so that a EV value of said lens-fitted film unit is set to said second EV value.

* * * * *